(12) United States Patent
Kojima

(10) Patent No.: US 8,397,663 B2
(45) Date of Patent: Mar. 19, 2013

(54) LIQUID BODY DISCHARGE DEVICE AND METHOD FOR DISCHARGING LIQUID BODY

(75) Inventor: Kenji Kojima, Suwa (JP)

(73) Assignee: Seiko Epson Corporation (JP)

( * ) Notice: Subject to any disclaimer, the term of this patent is extended or adjusted under 35 U.S.C. 154(b) by 1100 days.

(21) Appl. No.: 12/354,170

(22) Filed: Jan. 15, 2009

(65) Prior Publication Data
US 2009/0191341 A1 Jul. 30, 2009

(30) Foreign Application Priority Data

Jan. 24, 2008 (JP) ................................ 2008-013424

(51) Int. Cl.
*B05B 7/06* (2006.01)
*B05B 3/00* (2006.01)
*B05B 9/06* (2006.01)
*B05C 5/00* (2006.01)
*B41J 29/38* (2006.01)
*B41J 23/00* (2006.01)
*B41J 2/15* (2006.01)
*B41J 2/145* (2006.01)
*B41J 2/155* (2006.01)
*B41J 2/21* (2006.01)

(52) U.S. Cl. .......... 118/314; 188/315; 188/323; 347/12; 347/13; 347/37; 347/40; 347/43; 347/101

(58) Field of Classification Search ................... 118/314, 118/315, 323; 347/12, 13, 40–43
See application file for complete search history.

(56) References Cited

U.S. PATENT DOCUMENTS

| 6,318,840 B1 * | 11/2001 | Sette et al. ....................... 347/37 |
| 6,682,171 B2 * | 1/2004 | Otsuka ............................. 347/43 |
| 7,393,073 B2 * | 7/2008 | Zach ............................... 347/12 |
| 8,118,386 B2 * | 2/2012 | Kojima ............................ 347/12 |

(Continued)

FOREIGN PATENT DOCUMENTS

| JP | 2002-273868 | 9/2002 |
| JP | 2006-035492 | 2/2006 |
| JP | 2006035492 A * | 2/2006 |

OTHER PUBLICATIONS

Machine English Translation of JP-2006035492A.*

*Primary Examiner* — Dah-Wei Yuan
*Assistant Examiner* — Binu Thomas
(74) *Attorney, Agent, or Firm* — Harness, Dickey & Pierce, P.L.C.

(57) ABSTRACT

A liquid body discharge device includes: a plurality of nozzles for discharging a liquid body to a liquid body discharged region of a substrate; and a plurality of heads including the plurality of nozzles. In the device, the liquid body is discharged to the liquid body discharged region of the substrate by moving one of the substrate and the plurality of heads. Further, an alignment direction of the plurality of nozzles provided to at least one of the plurality of heads is different from an alignment direction of the plurality of nozzles provided to a rest of the plurality of heads. Furthermore, the at least one of the heads moves in a moving path A and the rest of the plurality of heads moves in a moving path B that is a different moving path from the moving path A.

6 Claims, 13 Drawing Sheets

U.S. PATENT DOCUMENTS

| | | | |
|---|---|---|---|
| 8,162,311 B2 * | 4/2012 | Shinohara | 271/112 |
| 2002/0105688 A1 * | 8/2002 | Katagami et al. | 358/505 |
| 2005/0253915 A1 * | 11/2005 | Matsumoto et al. | 347/104 |
| 2006/0103707 A1 * | 5/2006 | Askeland et al. | 347/101 |
| 2009/0101064 A1 * | 4/2009 | Naka et al. | 118/313 |
| 2009/0184999 A1 * | 7/2009 | Kojima | 347/40 |

* cited by examiner

LIQUID BODY DISCHARGE DEVICE AND METHOD FOR DISCHARGING LIQUID BODY

BACKGROUND

1. Technical Field

The present invention relates to a liquid body discharge device and a method for discharging a liquid body.

2. Related Art

There have been liquid discharge devices that discharge liquids such as functional liquids and ink to substrates made of glass, ceramic, resin, or silicon to form (also referred to as "draw") predetermined patterns (also referred to as "drawing patterns") on the substrates. One of such devices has a head in which a discharge mechanism and a circuit substrate for controlling the discharge mechanism are built. The discharge mechanism applies a pressure to a liquid body in a pressure chamber provided in a middle of a flow path through which the liquid body flows by using an electrostrictive property of a piezoelectric element or thermal energy. The liquid body to which the pressure is applied is discharged from a nozzle that is formed in the head and located at the end of the flow path. A plurality of nozzles is commonly formed as a nozzle group. The nozzles are aligned in a substantially straight line as an alignment direction with a predetermined nozzle distance (pitch).

When color filters are formed on a single substrate by drawing patterns using such a liquid body discharge device, there is a case where liquid discharged regions to which color liquids of R (red), G (green), and B (blue) are discharged, i.e., the drawing pattern of drawing regions of color pixels in a first color filter is different from that of a second color filter. In a case where a plurality of color filters corresponding to different display sizes from one another is formed on a single substrate and color pixels corresponding to R, G, and B have a rectangular shape with a longitudinal side, a drawing pattern of a first color filter differs from a drawing pattern of a second color filter. For example, the longitudinal direction of the color pixels included in one drawing pattern is orthogonal to that of the color pixels included in another drawing pattern. Since the longitudinal directions of the color pixels of the color filters are orthogonal to each other, a pitch between the color pixels adjacent each other in the first color filter is shorter than a pitch between the color pixels in the second color filter when they are viewed from the longitudinal direction of the color pixels of the second color filter. In this case, when respective color liquids are discharged from nozzles that are formed in a manner being aligned in a predetermined alignment direction in the heads so as to draw color pixels in the plurality of color filters, the following problem may occur. If the alignment direction of the nozzles is substantially in parallel with the longitudinal direction of each of the color pixels, the color pixels can be formed. In contrast, if the alignment direction of the nozzles is substantially orthogonal to the longitudinal direction of the color pixels, some pixels are not formed because the pixel pitch is short in the alignment direction of the nozzles.

To cope with such a problem, the alignment direction of the nozzles needs to be optimized in a direction based on each drawing pattern. For example, JP-A-2002-273868 discloses a technique in which the alignment direction of nozzles (a nozzle group) is rotated to an angle suitable for the pixel pitch of each color pixel to draw each color pixel.

However, in a case where the alignment direction of the nozzles is rotated as described above, the head needs to be provided with a rotating mechanism for rotating the nozzle group. Provision of the rotating mechanism causes difficulty in replacing the head since the head becomes heavy due to the weight of the rotating mechanism. In addition, the position of the nozzle group after being rotated is varied due to uneven rotations or backlashes existing in no small part of rotating mechanisms, whereby the liquid bodies can not be discharged at desired positions.

SUMMARY

An advantage of the present invention is to provide a liquid body discharge device and a method for discharging a liquid body by using the device that can draw patterns different from each other without employing a rotating mechanism for rotating an alignment direction of nozzles.

A liquid body discharge device according to a first aspect of the invention includes: a plurality of nozzles for discharging a liquid body to a liquid body discharged region of a substrate; and a plurality of heads including the plurality of nozzles. In the device, the liquid body is discharged to the liquid body discharged region of the substrate by moving one of the substrate and the plurality of heads. Further, an alignment direction of the plurality of nozzles provided to at least one of the plurality of heads is different from an alignment direction of the plurality of nozzles provided to a rest of the plurality of heads. Furthermore, the at least one of the heads moves in a moving path A and the rest of the plurality of heads moves in a moving path B that is a different moving path from the moving path A.

According to the structure of the aspect, the alignment direction of the nozzles provided to the head moving on the moving path A is different from the alignment direction of the nozzles provided to the head moving on the moving path B. Therefore, when the liquid body is discharged from the nozzles to the liquid body discharged region, the nozzles for discharging the liquid body to the liquid body discharged region can be moved and used in each of the moving paths that are different from each other, being able to discharge the liquid body from the nozzles aligned in a desired alignment direction depending on a shape of the liquid body discharged region (a shape of each color pixel of a color filter, for example). Thus, the drawing patterns different from each other can be drawn without providing a head having a rotating mechanism for rotating the alignment direction of the nozzles. As a result, the head does not become heavy and positioning shifts of the nozzles caused by the rotation do not occur.

The liquid discharge device of the first aspect may further include: a head moving unit that moves the at least one of the plurality of heads in a first direction along the moving path A in a case where the liquid body is discharged from the plurality of nozzles provided to the at least one of the plurality of heads to the liquid body discharged region; and a substrate moving unit that moves the substrate in a second direction that is different from the first direction in a case where the liquid body is discharged from the plurality of nozzles provided to the rest of the plurality of heads to the liquid body discharged region.

In such structure, the device moves the at least one of the heads in the first direction by the head moving unit and moves the substrate in the second direction by the substrate moving unit. Therefore, the liquid body can be discharged to the liquid body discharged region from the nozzles aligned in one alignment direction in the first direction and from the nozzles aligned in the other alignment direction in the second direction. Thus, the liquid body can be discharged from the nozzles moving in the first direction or the nozzles moving in the second direction, that is, the nozzles aligned in an alignment direction suitable for a desired drawing pattern depending on a shape of the liquid body discharged region (a shape of each color pixel, for example).

The liquid discharge device of the first aspect may further include: a substrate moving unit that moves the substrate in the first direction along the moving path A in a case where the liquid body is discharged from the plurality of nozzles provided to the at least one of the plurality of heads to the liquid body discharged region, and moves the substrate in the second direction that is different from the first direction in a case where the liquid body is discharged from the plurality of nozzles provided to the rest of the plurality of heads to the liquid body discharged region.

Accordingly, the liquid body is discharged from the nozzles provided to the at least one of the heads to the liquid body discharged regions aligned in the first direction by the movement of the substrate, and the liquid body is discharged from the nozzles provided to the rest of the heads to the liquid body discharged regions aligned in the second direction also by the movement of the substrate. Therefore, the liquid body can be discharged to the liquid body discharged regions from the nozzles aligned in one alignment direction in the first direction and from the nozzles aligned in the other alignment direction in the second direction. Thus, the liquid body can be discharged from the nozzles moving in the first direction or the nozzles moving in the second direction, that is, the nozzles aligned in an alignment direction suitable for a desired drawing pattern depending on a shape of the liquid body discharged region (a shape of each color pixel, for example).

In the liquid body discharge device of the first aspect, in a case where the at least one of the plurality of heads is formed in a plural number, the heads may be apposed in a direction orthogonal to the first direction.

In this case, the plurality of heads that move in the first direction is apposed in the direction orthogonal to the first direction. Therefore, when the plurality of heads apposed in the orthogonal direction move in the first direction, a width of the liquid body discharged regions to which the liquid body is discharged from the nozzles is widened. Accordingly, an area of the liquid body discharged regions covered by the one time relative movement of the heads becomes large. As a result, the number of relative movements of the heads for discharging the liquid body to all the liquid body discharged regions can be reduced.

In the liquid body discharge device of the first aspect, the alignment direction of the plurality of nozzles provided to the at least one of the plurality of heads and the alignment direction of the plurality of nozzles provided to the rest of the plurality of heads may be substantially orthogonal to each other.

Since the nozzles of the heads are aligned in a nearly orthogonal relation, there is a high probability that the nozzles having a preferable alignment direction corresponding to a shape of the liquid discharged regions exist.

In the liquid body discharge device of the first aspect, the first direction and the second direction may be substantially orthogonal to each other.

A shape of the liquid body discharged region is commonly in a rectangular shape of which sides are orthogonal to each other, and there is high probability that the liquid body discharged regions have shapes of which longitudinal directions are orthogonal to each other. The device having above structure can discharge the liquid body from the nozzles aligned in a suitable alignment direction in accordance with the shape of the liquid body discharged region.

A method, according to a second aspect of the invention, for discharging a liquid body that is discharged by moving one of a substrate and a plurality of heads includes: in a case where at least one of the plurality of heads, each including a plurality of nozzles for discharging the liquid body to a liquid body discharged region of the substrate, moves on a moving path A and a rest of the plurality of heads moves on a moving path B that is different from the moving path A, a) moving the at least one of the plurality of heads in a first direction along the moving path A in a case where the liquid body is discharged from the plurality of nozzles provided to the at least one of the plurality of heads to the liquid body discharged region; and b) moving the substrate in a second direction that is different from the first direction in a case where the liquid body is discharged from the plurality of nozzles provided to the rest of the plurality of heads to the liquid body discharged region. In the method, an alignment direction of the plurality of nozzles provided to the at least one of the plurality of heads is different from an alignment direction of the plurality of nozzles provided to the rest of the plurality of heads.

According to the method of the second aspect, in the liquid discharged regions, the heads move in the first direction while the substrate moves in the second direction. The liquid body can be discharged to the liquid body discharged regions from the heads having the nozzles aligned in different alignment directions from each other. As a result, the liquid body can be discharged from the nozzles aligned in a suitable alignment direction corresponding to a shape of the liquid body discharged region (a shape of each color pixel of a color filter, for example).

In the method of the second aspect, a total area of the liquid body discharged region in the step (a) may be smaller than a total area of the liquid body discharged region in the step (b).

There may be a case where the head takes longer time to move in the liquid body discharged region than the substrate does. This is because of the following reason. There is a high possibility that the discharged position accuracy of the liquid body discharged to the liquid body discharged region by moving the head is inferior to that of the liquid body discharged to the liquid body discharged region by moving the substrate since the head is heavy or the accuracy is affected by the vibrations caused by the movement of the head. To avoid such problem, the moving speed of the substrate is set lower than that of the head. In such a case, the total area of the liquid body discharged region to which the liquid body is discharged by moving the head is set to be smaller than that to which the liquid body is discharged by moving the substrate, suppressing the increase of time taken to discharge the liquid body to all the liquid body discharged regions.

BRIEF DESCRIPTION OF THE DRAWINGS

The invention will be described with reference to the accompanying drawings, wherein like numbers reference like elements.

DESCRIPTION OF EXEMPLARY EMBODIMENT

Figure 1:
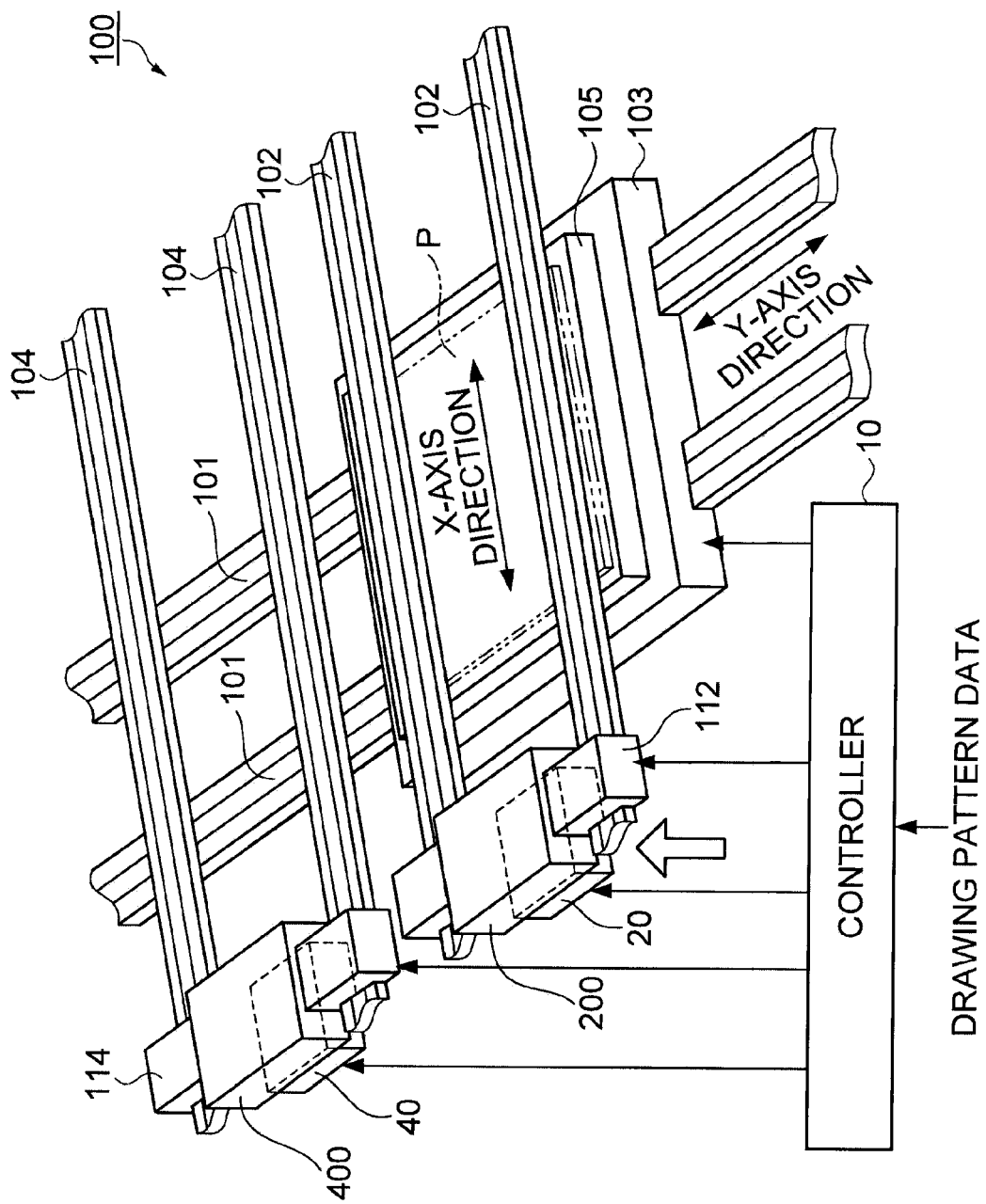
FIG. 1 is a schematic configuration view of a liquid body discharge device according to an embodiment of the invention.

An embodiment of the invention will now be described. FIG. 1 is a perspective view illustrating a schematic configuration of a liquid body discharge device 100 of the embodiment. The liquid body discharge device 100 of the embodiment is a device to form a color filter by discharging color liquid bodies in red (R), green (G), and blue (B) respectively on color pixels formed on a substrate P. The substrate P is an object to be discharged and the color pixels are regions to be discharged.

As shown in FIG. 1, the liquid body discharge device 100 is provided with a pair of guide rails 101 that are linearly formed, and a movable stage 103 moving in a linear axis direction (referred to as a Y-axis direction in the embodiment) by air sliders and linear motors (not shown) disposed inside the guide rails 101. On the movable stage 103, a stage 105 on which the substrate P is placed is formed. The stage 105 is adapted to suck and fix the substrate P.

Above the stage 105, a pair of guide rails 102 and a pair of guide rails 104 are formed apart from the stage 105 with a predetermined distance so as to be orthogonal to the guide rails 101, i.e., disposed at a side adjacent to one surface of the stage 105 having the other surface which is opposite to the one surface, facing the movable stage 103. In the embodiment, a direction from the one surface of the stage 105 to the pair of the guide rails 102 is referred to as an upper direction while a direction opposite to the upper direction is referred to as a lower direction. The guide rails 102 and the guide rails 104 are formed to have a linear axis direction (referred to as an X-axis direction in the embodiment).

The liquid body discharge device 100 is provided with a carriage 200 and a carriage 400 that respectively move along the pair of the guide rails 102 and the pair of the guide rails 104. That is, the carriage 200 is provided with a carriage moving stage 112 at its both sides, and formed to be movable along the X-axis direction with air sliders and linear motors (not illustrated) disposed inside the guide rails 102. In the same manner, the carriage 400 is provided with a carriage moving stage 114 at its both sides, and formed to be movable along the X-axis direction with air sliders and linear motors (not illustrated) disposed inside the guide rails 104.

The carriage 200 is provided with a nozzle head 20 at the lower direction side. The nozzle head 20 includes a plurality of nozzles and discharge mechanisms. The nozzles are drilled and formed so as to show a predetermined alignment direction and discharge liquid bodies having different colors. Each of the nozzles is provided with the discharge mechanism so as to discharge the liquid bodies. Further, the carriage 400 is provided with a nozzle head 40 at the lower direction side. The nozzle head 40 includes a plurality of nozzles and discharge mechanisms. The nozzles are drilled and formed so as to show a predetermined alignment direction and discharge liquid bodies having different colors. Each of the nozzles is provided with the discharge mechanism so as to discharge the liquid bodies. The color liquid bodies having been supplied to the carriages 200 and 400 from a liquid supplying mechanism (not illustrated) are respectively supplied to the nozzle heads 20 and 40 via flow paths (not illustrated) and discharged from the nozzles as droplets by the discharge mechanism formed at each of the nozzles. Each of the nozzle heads 20 and 40 in the embodiment exemplarily corresponds to "head" described in Claims.

In the liquid body discharge device 100 in the embodiment, an alignment direction of the nozzles formed in the nozzle head 20 is set to be different from an alignment direction of the nozzles formed in the nozzle head 40. This configuration will be described with reference to FIG. 2.

Figure 2:
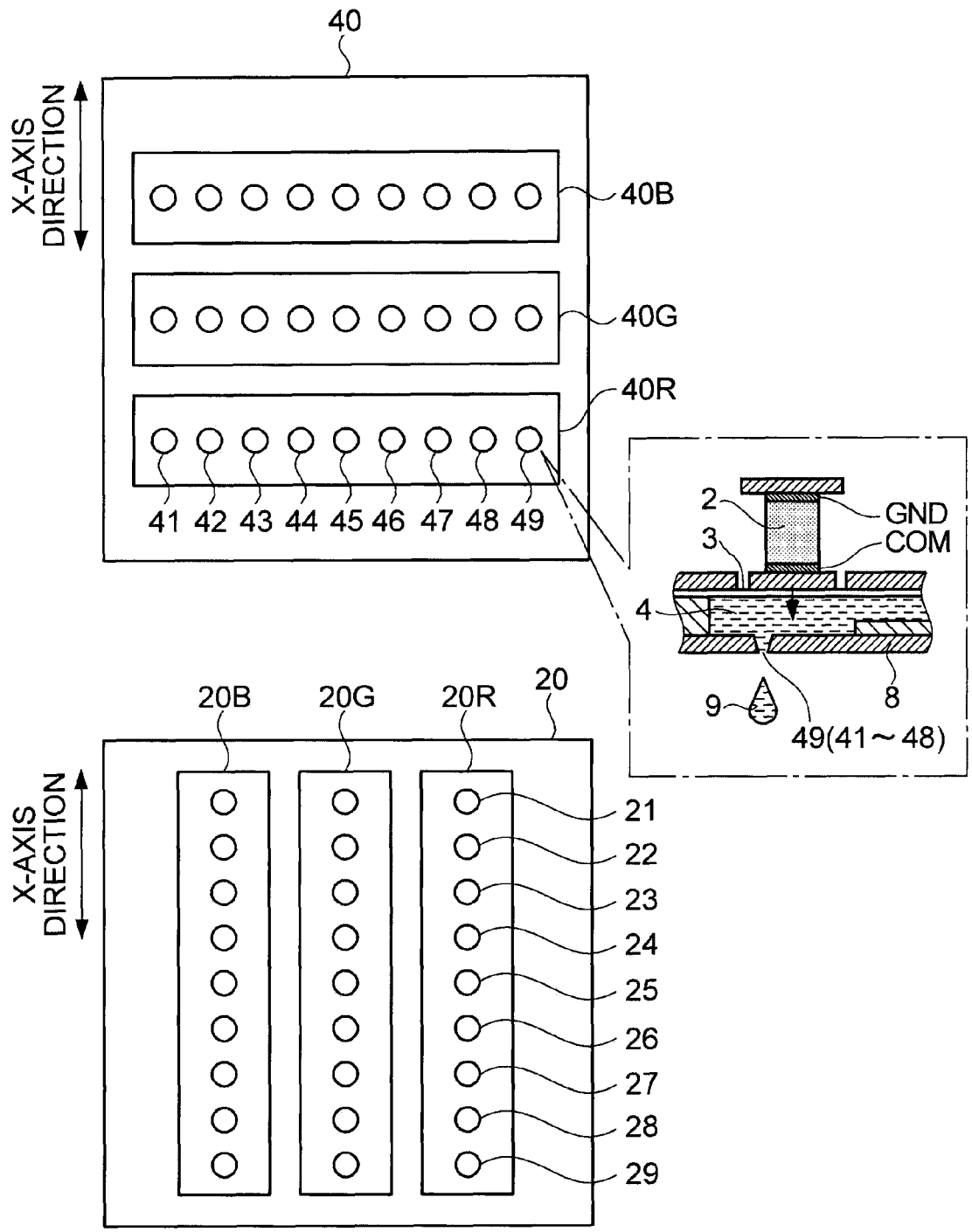
FIG. 2 is a schematic view illustrating alignment conditions of nozzles formed in nozzle heads.

FIG. 2 is a schematic view showing alignment conditions of the nozzles formed in the nozzle heads 20 and 40 when viewed from the lower direction as indicated by an outlined arrow in FIG. 1. Here, the nozzle head 20 provided to the carriage 200 is shown on the lower side in FIG. 2, while the nozzle head 40 provided to the carriage 400 is shown on the upper side in FIG. 2. The X-axis direction is also shown in FIG. 2.

In the embodiment, as illustrated, the nozzle head 20 is provided with nozzle groups 20R, 20G, and 20B for discharging respective liquid bodies corresponding to R, G, and B. Each of the nozzle groups 20R, 20G, and 20B has a nozzle row in which the nozzles 21 to 29, i.e., nine nozzles are aligned in a nearly straight line. The alignment direction of the nozzles coincides with the X-axis direction.

Likewise, as illustrated, the nozzle head 40 is provided with nozzle groups 40R, 40G, and 40B for discharging respective liquid bodies corresponding to R, G, and B. Each of the nozzle groups 40R, 40G, and 40B has a nozzle row in which the nozzles 41 to 49, i.e., nine nozzles are aligned in a nearly straight line. However, the alignment direction of the nozzles is orthogonal to the X-axis direction unlike that of the nozzles in the nozzle head 20.

Each of the nozzles formed in the nozzle heads 20 and 40 is provided with the discharge mechanism, as described above, so as to discharge a predetermined amount of the liquid body as a droplet by generating pressure to the liquid body in the nozzle head. The discharge mechanisms for all the nozzles have similar configurations.

The discharge mechanism has a configuration as shown in a balloon in FIG. 2 in the embodiment, and includes a piezoelectric element 2 serving as an actuator. The piezoelectric element 2 is deformed and contracted or deformed and extended by an electrostrictive property, when a predetermined voltage waveform is applied between an electrode COM and an electrode GND that are disposed at opposite ends of the piezoelectric element 2. Thus the vibration plate 3 is deformed to pressurize a liquid body in a pressure chamber 4 formed in the middle of the liquid body flow path. As a result, the pressurized liquid body is discharged as a droplet 9 from the nozzle 49 (i.e. nozzles 41 to 48) drilled and formed in a bottom member 8 of the nozzle head. Alternatively, a so-called thermal system using a heating element as an actuator can be also employed, for example, as the discharge mechanism.

In the embodiment, the nozzle groups having nine nozzles are exemplified for simplifying explanation. However, several tens to several hundreds of nozzles are respectively formed in a predetermined pitch in practice. In addition, each of the nozzle groups may include a plurality of nozzle rows, such as two nozzle rows. In a case of two nozzle rows, the nozzles are drilled and formed such that one nozzle row is shifted by a half pitch with respect to the other nozzle row to form a zigzag alignment, for example. Further, a plurality of nozzle groups may be formed corresponding to each of the color liquid bodies. In the embodiment, all pitches between nozzles formed in nozzle heads 20 and 40 are same as each other. The pitches, of course, may be different from each other.

Referring back to FIG. 1, the liquid body discharge device 100 is provided with a controller 10. The controller 10 controls: the movement of the movable stage 103 in the Y-axis direction, i.e., the movement of the substrate P in the Y-axis direction; the movement of the carriage moving stages 112 and 114 respectively provided to the carriages 200 and 400 in the X-axis direction, i.e., the movement of the carriages 200 and 400 in the X-axis direction; and the driving of the discharge mechanisms formed in the nozzle heads 20 and 40, i.e., the discharging of the liquid body, by using data of a drawing pattern drawn on the substrate P. In the embodiment, the drawing pattern data is coordinate data in which each of color pixels of a color filter is defined as a coordinate position on the substrate P.

Figure 3:
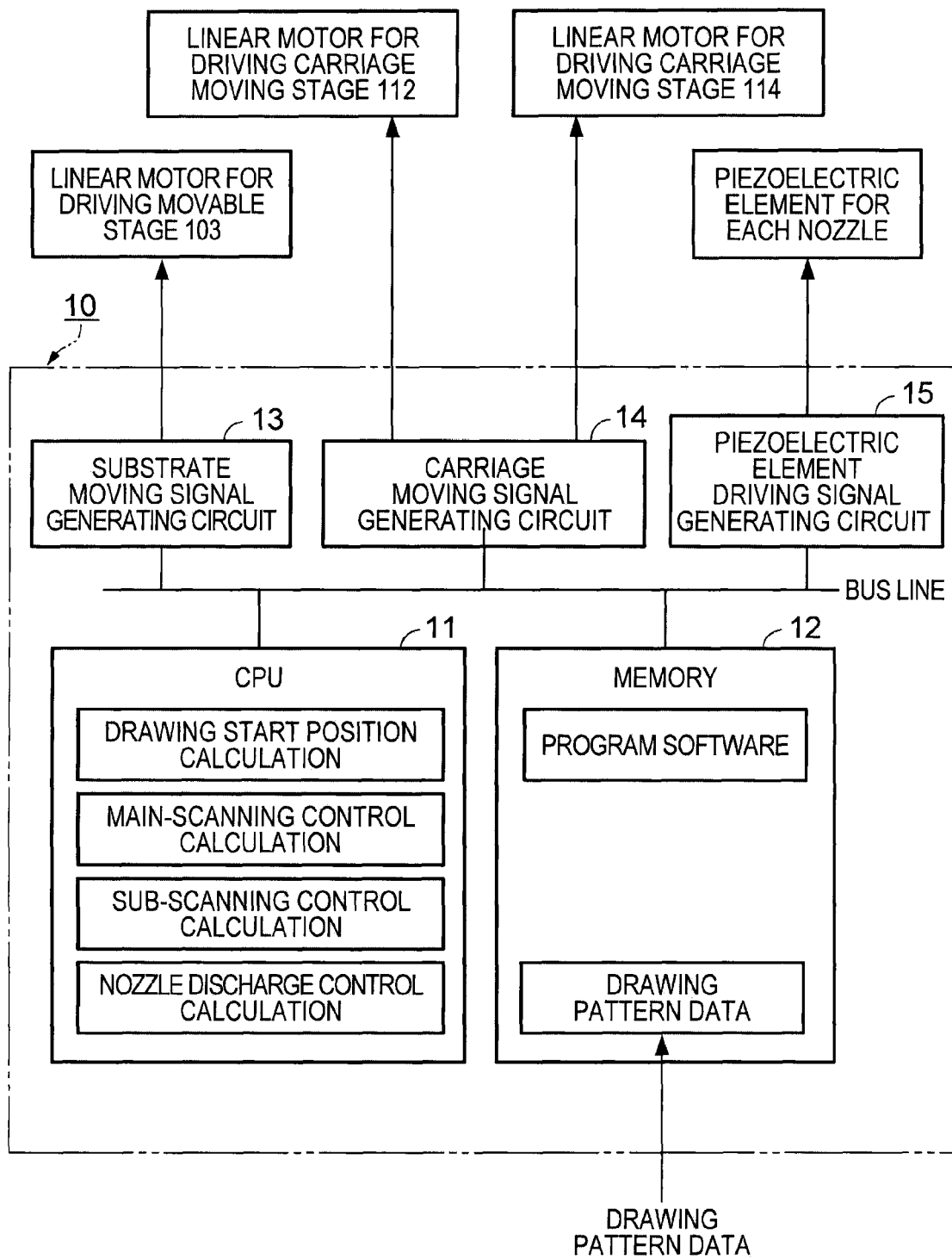
FIG. 3 is a block diagram for explaining a function of a controller.

Next, the controller 10 will be described with reference to a block diagram shown in FIG. 3. The controller 10 includes, as shown in FIG. 3, a CPU 11, a memory 12, a substrate moving signal generating circuit 13, a carriage moving signal generating circuit 14, and a piezoelectric element driving signal generating circuit 15 that are coupled to each other through a bus line. Each output signal of the substrate moving signal generating circuit 13, the carriage moving signal generating circuit 14, and the piezoelectric element driving signal generating circuit 15 is outputted as a predetermined voltage signal to a linear motor for driving the movable stage 103, a linear motor for driving the carriage moving stage 112, a linear motor for driving the carriage moving stage 114, and the piezoelectric element for each nozzle, through an interface as necessary.

The CPU 11 executes a drawing start position calculation, a main-scanning control calculation, a sub-scanning control calculation, and a nozzle discharge control calculation in order to form a predetermined drawing pattern on the substrate P by discharging each color liquid body based on drawing pattern data that is inputted to the controller 10 and stored in the memory 12 through an interface (not illustrated) or the like.

Here, the main scan means a movement while the liquid bodies are discharged during the relative movement between the substrate P and the nozzles. A main-scanning direction may be a moving direction of a substrate (Y-axis direction) or a moving direction of a carriage (X-axis direction) depending on a drawing pattern. The sub scan means a movement during the time, in which no liquid bodies are discharged from the nozzles, from the end of one main scan to the start of next main scan in the relative movement between the substrate P and the nozzles. A sub-scanning direction may be the moving direction of a substrate (Y-axis direction) or the moving direction of a carriage (X-axis direction) depending on a drawing pattern.

The CPU 11 controls the substrate moving signal generating circuit 13 and the carriage moving signal generating circuit 14 based on the calculated control data of the main scan and the sub scan, thereby generating and outputting a driving signal for each of the linear motors. Concurrently, the CPU 11 controls the piezoelectric element driving signal generating circuit 15 based on the calculated control data to discharge respective color liquid bodies from nozzles during the main scan so as to output driving signals for the piezoelectric elements.

As described above, the liquid body discharge device 100 of the embodiment moves the movable stage 103 and the carriage moving stage 112 or the carriage moving stage 114 so as to allow the nozzle groups 20R, 20G, and 20B, or the nozzle groups 40R, 40G, and 40B to relatively move with respect to the substrate P, while controlling the discharge mechanism provided to each of the nozzles so as to control ON (to discharge) and OFF (not to discharge) states of the liquid body discharge. As a result, the liquid body is discharged at a position along a main-scanning trajectory of the main scan of the nozzles 21 to 29 or the nozzles 41 to 49 on the substrate P, thus drawing a predetermined pattern. In each of the nozzle groups, a few nozzles positioned at an end are sometimes not used in view of the difference in discharging characteristics from other nozzles.

Figure 4:
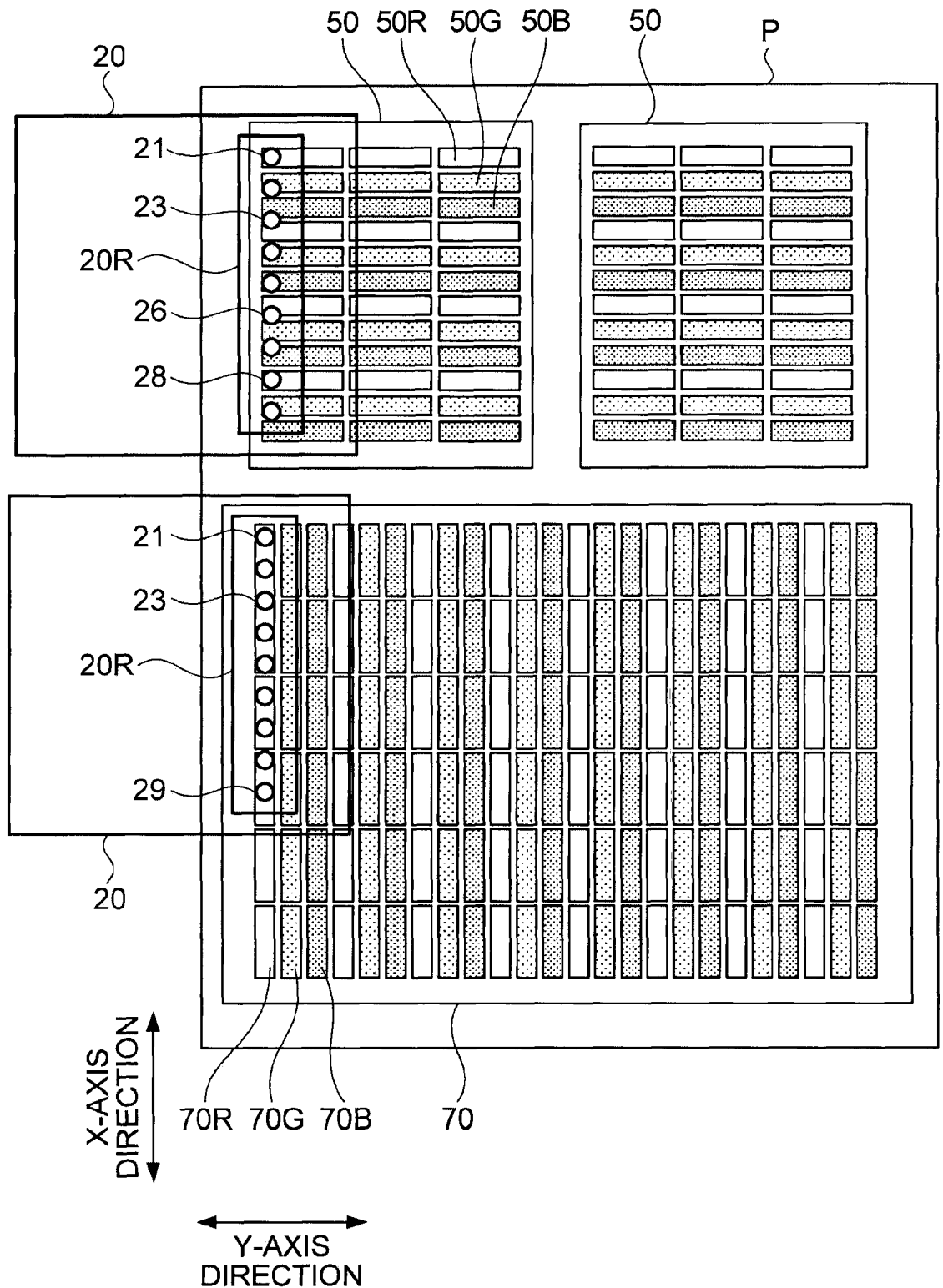
FIG. 4 is an explanatory view for explaining a method for drawing a pattern to form a color filter on a substrate according to the embodiment of the invention.
Figure 5:
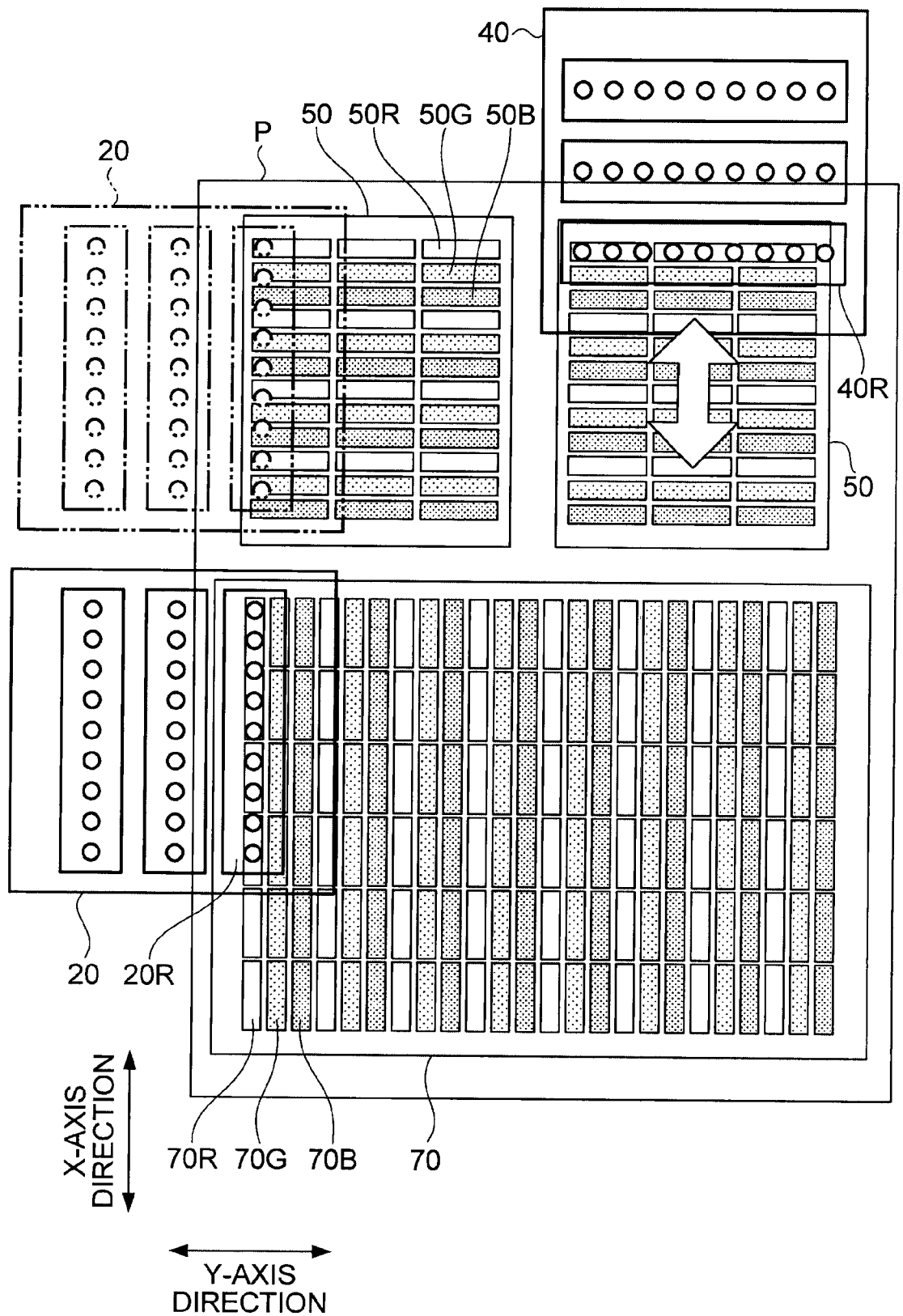
FIG. 5 is an explanatory view for explaining a method for drawing a pattern to form a color filter on a substrate according to the embodiment of the invention.

Subsequently, a drawing process by the liquid body discharge device 100 of the embodiment in a case of forming drawing patterns that are different from each other on the substrate P will be described. Prior to this, an outline of the process is described with reference to FIGS. 4 and 5. FIGS. 4 and 5 are explanatory diagrams viewed from the above of the substrate P and showing a relation of liquid body discharged regions of respective colors formed on the substrate P and the nozzle heads. Here, the nozzle heads are shown in a transparent view. In addition, the sizes of the liquid body discharged regions of the respective color liquid bodies and the nozzle heads are exaggeratingly illustrated for the description.

FIG. 4 shows a state in which one piece of color filter 70 for a large-sized screen and two pieces of a color filter 50 each for a small-sized screen are formed on the substrate P. The color filter 70 has a drawing pattern in which liquid body discharged regions (color pixels) of a rectangular shape having a longitudinal side extending in the X-axis direction are formed in a matrix. The liquid body discharged regions are regions 70R, 70G, and 70B to which the respective color liquid bodies R, G, and B are repeatedly and subsequently discharged along the Y-axis direction to form a stripe alignment. The regions are separated from each other with a bank or the like made of resin. On the other hand, the color filter 50 has a drawing pattern in which liquid body discharged regions of a rectangular shape having a longitudinal side extending in the Y-axis direction are formed in a matrix. The liquid body discharged regions are regions 50R, 50G, and 50B to which the respective color liquid bodies R, G, and B are repeatedly and subsequently discharged along the X-axis direction to form a stripe alignment. The regions are separated from each other with a bank or the like made of resin.

In the embodiment, the Y-axis direction is orthogonal to the X-axis direction. Therefore, the color filter 50 and the color filter 70 have different drawing patterns in regard to the longitudinal directions of the rectangular regions from each other. That is, the longitudinal direction of the liquid body discharged region of the color filter 50 and the longitudinal direction of the liquid body discharged region of the color filter 70 are orthogonal to each other. In regard to a drawing pattern to be formed on the substrate P, when a pattern of a color filter for a large-sized screen and a pattern of another color filter for a small-sized screen are concurrently drawn as described above, a case frequently occurs in which the longitudinal directions of the liquid body discharged regions for the patterns are different from each other, e.g., the longitudinal directions are orthogonal to each other. This case is caused by an attempt of efficient utilization of the regions of the substrate P.

Now, a case will be exemplified in which patterns to form the color filter 50 and the color filter 70 are drawn on the substrate P by using the carriage 200 regarding the Y-axis direction as the main-scanning direction. Further, a liquid body R is assumed to be discharged from the nozzles 21 to 29 of the nozzle group 20R to regions 50R and regions 70R as it should be. The description below is also applicable to the nozzle group 20G and the nozzle group 20B although illustration and description thereof will be omitted.

In this case, as illustrated, nozzles other than the nozzle 23 among the nozzles 21 to 29 can discharge the liquid body R in the whole of the regions 70R overlapped with a scanning trajectory of the nozzles in the color filter 70 with one main scan. In contrast, in the color filter 50, intervals (i.e., a color pixel pitch) between the regions 50R, 50G, and 50B in an alignment direction of the nozzles, namely in the X-axis direction, are short, that is, a width of the region 50R is narrow. Therefore, the nozzles 21 and 28 among the nozzles 21 to 29 can discharge the liquid body R to the regions 50R, but the nozzles 23 and 26 become hard to discharge the liquid body R to the regions 50R. Accordingly, in the case of the color filter 50, the nozzle head 20 is required to be moved in the X-axis direction, i.e., moved as the sub scan, so as to be in a position in which the nozzles are overlapped with the regions 50R in plan view, and then the main scan needs to be repeated at each time. This increases the number of main scans, thereby taking longer time to complete the drawing.

In such a case, as shown in FIG. 5, the pattern to form the color filter 70 is drawn by using the nozzle head 20 whereas the pattern to form the color filter 50 is drawn by not using the nozzle head 20 but using the nozzle head 40. That is, as illustrated, a nozzle alignment direction of the nozzle groups in the nozzle head 40 is in the Y-axis direction. Therefore, as shown by the outlined arrow in FIG. 5, if the nozzle head 40 is relatively moved with respect to the substrate P in the X-axis direction as the main-scanning direction, one main scan enables the nozzles 41 to 49 of the nozzle group 40R to discharge the liquid body R to a nearly whole of the regions 50R overlapped with the main-scanning trajectory of the nozzles, for example. Further, as for the color filter 50, the number of main scans is prevented from increasing, thereby also providing an advantageous effect that the time taken to complete the drawing is not increased.

Figure 6:
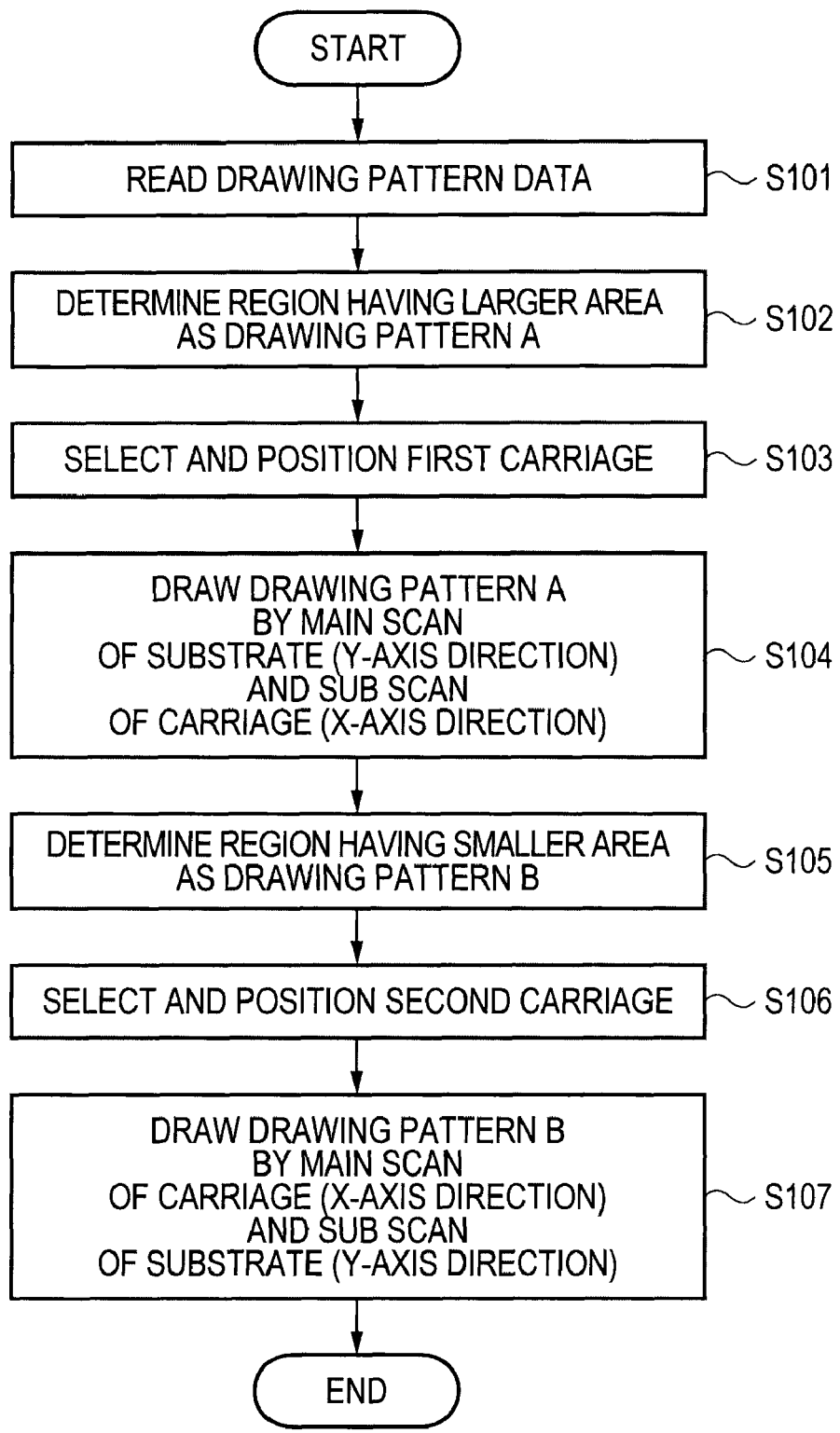
FIG. 6 is a flowchart showing processing steps conducted by the liquid body discharge device of the embodiment.

Referring now to the flowchart shown in FIG. 6, the drawing process performed by the liquid body discharge device 100 of the embodiment will be described. The procedures of this process are stated in a program software (refer to FIG. 3) stored in the memory 12. The CPU 11 reads and executes the program software.

In a step S101, drawing pattern data is first read. The drawing pattern data is inputted into the memory 12 of the controller 10 for every substrate P sucked and fixed to the stage 105 shown in FIG. 1. The CPU 11 reads the inputted drawing pattern data. In the embodiment, the drawing pattern data is data for drawing patterns of the two pieces of the color filters 50 and a pattern of the one piece of the color filter 70 as shown in FIG. 4.

Then, in a step S102, a region, to which liquid bodies are discharged, having a larger area is determined as a drawing pattern A. The CPU 11 sums up all region areas of the regions 50R, 50G, and 50B, in which the respective color liquid bodies R, G, and B are discharged, of the two pieces of the color filters 50. Likewise, the CPU 11 sums up all region areas of the regions 70R, 70G, and 70B, in which the respective color liquid bodies R, G, and B are discharged, of the color filter 70. Then, the region having a larger area in total is determined as the drawing pattern A. In the embodiment, each region is indicated by coordinate data. The CPU 11 calculates an area of each of the regions based on the coordinate data.

Then, in a step S103, a first carriage is selected and positioned. The CPU 11 selects the carriage 200 provided with the nozzle head 20 having nozzles aligned in the X-axis direction as a first carriage so as to draw a color pattern in R, G, and B to form the color filter 70. Then, the linear motors are driven so as to move the carriage moving stage 112 along the guide rails 102, thus positioning the carriage 200 at a calculated drawing start position. In the embodiment, the substrate P is preliminary sucked and fixed on the stage 105 so that the longitudinal directions of the liquid body discharged regions in the drawing pattern of the color filter 70 are parallel to the X-axis direction.

Figure 7:
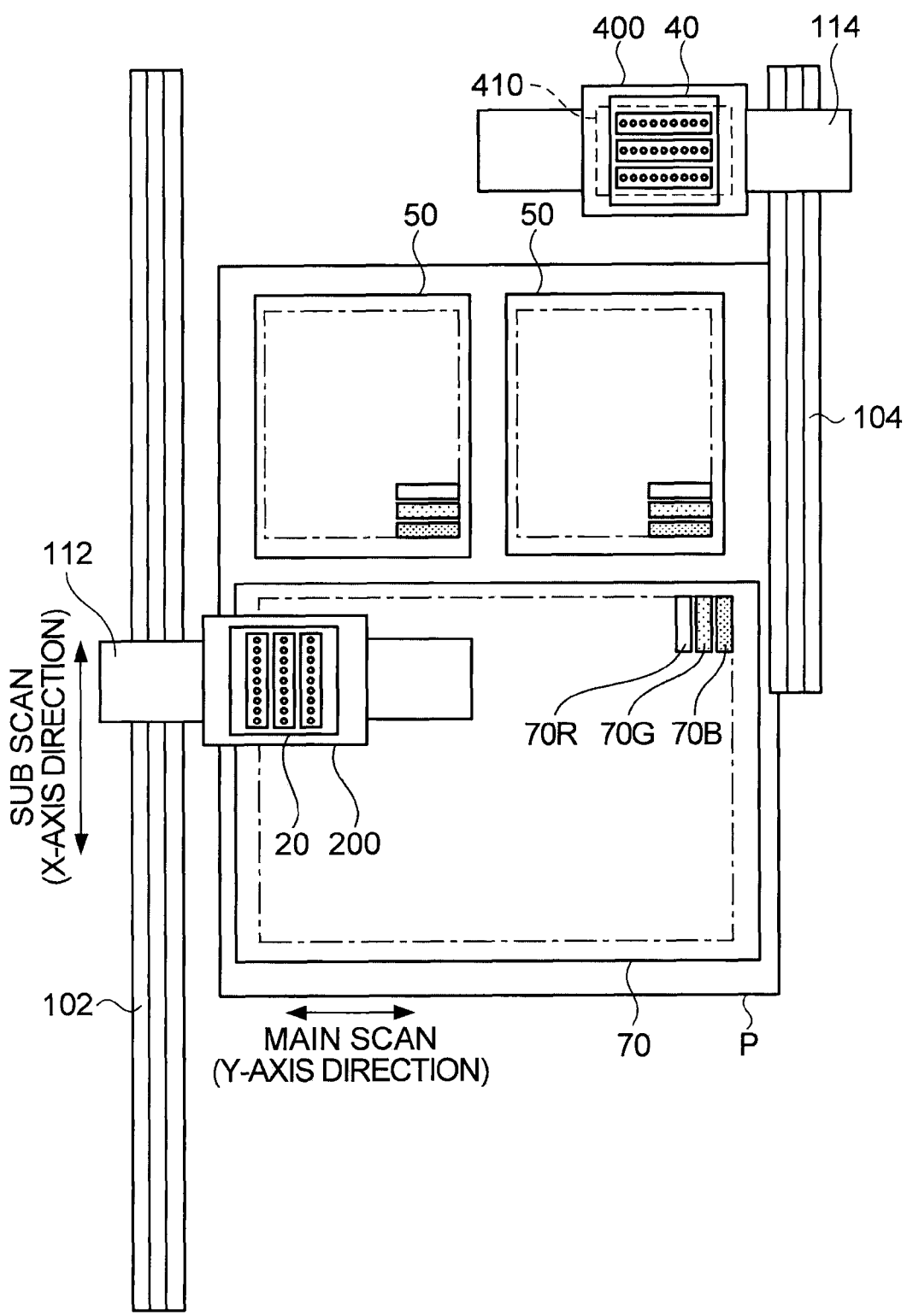
FIG. 7 is a schematic view illustrating a state in which a pattern to form a color filter is drawn by the nozzle heads.

Next, in a step S104, the substrate P is moved as a main scan (in the Y-axis direction) and the carriage is moved as a sub scan (in the X-axis direction) so as to draw the drawing pattern A. This processing will be explained with reference to FIG. 7. FIG. 7 is a schematic view illustrating a state in which the pattern of the color filter 70 is drawn by the nozzle head 20 included in the carriage 200 when the substrate P is viewed from the top. Here, one guide rail, which is positioned on the right side in the drawing, of the pair of the guide rails 102 and one guide rail, which is positioned on the left side in the drawing, of the pair of the guide rails 104 are not illustrated so as to simplify the drawing. In addition, the nozzle head 20 and the nozzle head 40 are shown in a transparent view.

Referring to the drawing, the substrate P is moved along a pair of guide rails 101 (not shown) in the Y-axis direction as the main scan. During the main scan, the piezoelectric element in the discharge mechanism provided to each of the nozzles of the nozzle head 20 is driven so as to discharge the color liquid bodies on the regions 70R, 70G, and 70B (FIG. 7 shows only a part of the regions) from the respective nozzles. On the other hand, the carriage 200 is moved along the guide rails 102 in the X-axis direction as the sub scan. At each time of the sub scan of the carriage 200, the substrate P is repeatedly moved as the main scan so as to respectively discharge the color liquid bodies in all of the regions 70R, 70G, and 70G. The drawing pattern A that is the drawing pattern for the color filter 70 is thus drawn.

Here, in the step S104 in the embodiment, the carriage 400 is moved to a position facing to a capping unit 410 provided in an area out of the main-scanning area of the substrate P so as to cover each of the nozzles in the nozzle head 40. The capping unit 410 is a unit to cover (cap) the nozzle head so as to prevent discharge defects of the liquid bodies caused by dryness or viscosity increase of the liquid bodies in the nozzles. Therefore, the capping unit 410 can prevent dryness or viscosity increase of the liquid bodies in the nozzle head 40 while the pattern to form the color filter 70 is drawn with the nozzle head 20. Further, due to the capping unit, whenever the liquid bodies need to be discharged for drawing, the liquid bodies are stably discharged from the nozzles.

Referring back to FIG. 6, in a step S105, a region, to which liquid bodies are discharged, having a smaller area is determined as a drawing pattern B. The CPU11 determines the region having a smaller area in total as the drawing pattern B.

In a step S106, a second carriage is selected and positioned. The CPU 11 selects the carriage 400 provided with the nozzle head 40 having nozzles aligned in the Y-axis direction as the second carriage so as to draw a color pattern of R, G, and B on the two pieces of the color filters 50. Then, the linear motors are driven so as to move the carriage moving stage 114 along the guide rails 104, thus positioning the carriage 400 at a calculated drawing start position.

Figure 8:
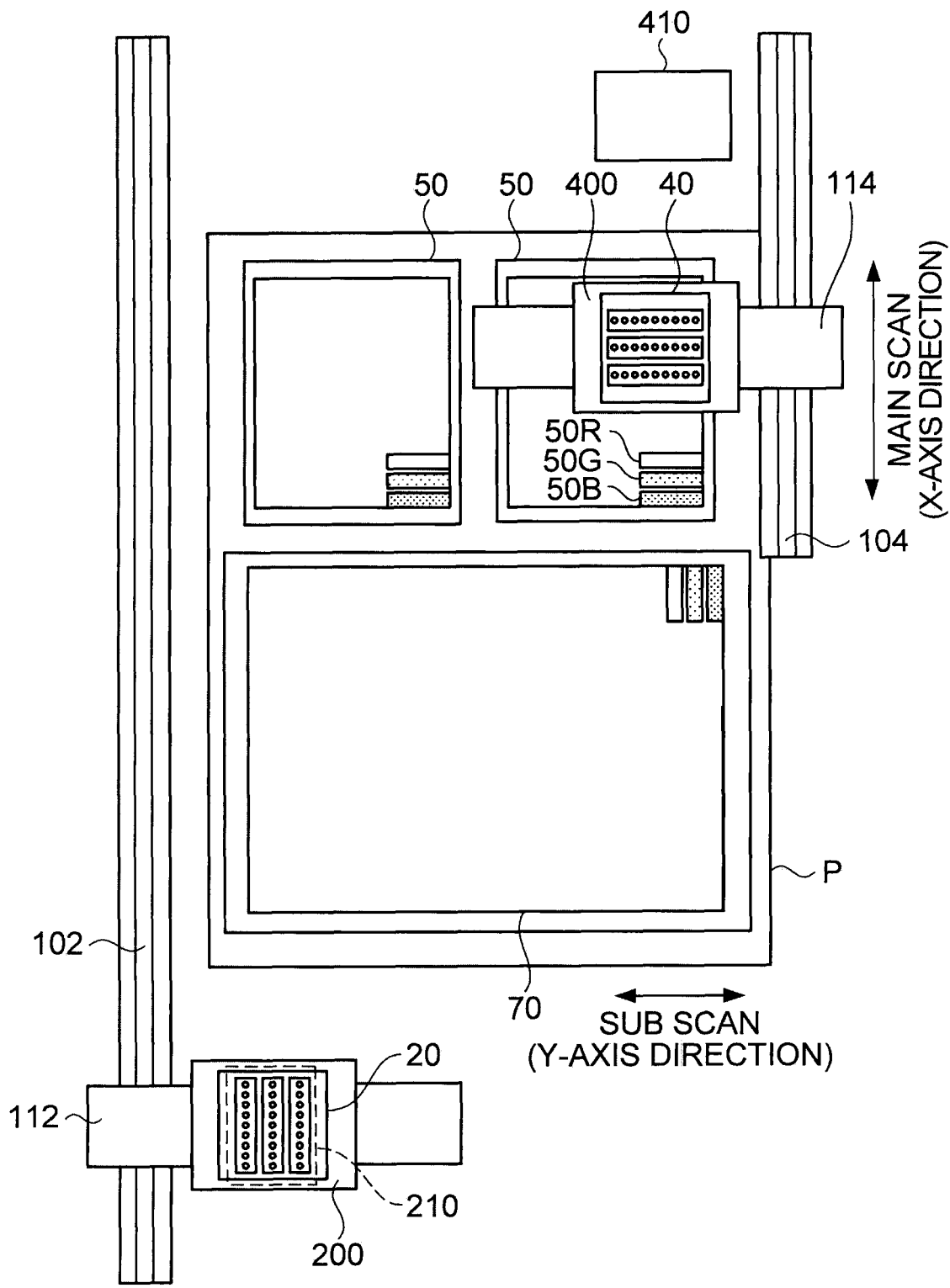
FIG. 8 is a schematic view illustrating a state in which a pattern to form a color filter is drawn by the nozzle heads.

Next, in a step S107, the carriage is moved as the main scan (in the X-axis direction) and the substrate P is moved as the sub scan (in the Y-axis direction) so as to draw the drawing pattern B. This processing will be explained with reference to FIG. 8. FIG. 8 is a schematic view illustrating a state in which the patterns of the color filters 50 are drawn by the nozzle head 40 included in the carriage 400 when the substrate P is viewed from the top.

As illustrated, the carriage 400 is moved along the pair of guide rails 104 (one of them is not shown) in the X-axis direction as the main scan. During the main scan, the piezoelectric element in the discharge mechanism formed on each of the nozzles of the nozzle head 40 is driven, discharging the color liquid bodies on the regions 50R, 50G, and 50B (FIG. 8 shows only a part of the regions) from the respective nozzles. On the other hand, the substrate P is moved along the guide rails 101 (not shown) in the Y-axis direction as the sub scan. At each time of the sub scan of the substrate P, the carriage 400 is repeatedly moved as the main scan so as to discharge the respective color liquid bodies in all of the regions 50R, 50G, and 50G. The drawing pattern B that is the drawing pattern for the two pieces of the color filters 50 is thus drawn.

Here, in the step S107 in the embodiment, the carriage 200 is moved to a position facing to a capping unit 210 provided in an area out of the main-scanning area of the substrate P at the main scan in the step S104 so as to cover each of the nozzles in the nozzle head 20. The capping unit 210 has a unit having the same function as that of the capping unit 410 described above. Therefore, the capping unit 210 can prevent dryness or viscosity increase of the liquid bodies in the nozzle head 20 while the patterns to form the color filters 50 are drawn with the nozzle head 40. Further, due to the capping unit, whenever the liquid bodies need to be discharged for drawing, the liquid bodies are stably discharged from the nozzles.

Accordingly, through the steps S101 to S107, the liquid discharge device 100 of the embodiment can draw the respective patterns, which have different longitudinal directions, of the color filters 70 and 50, which are to be used for different sized screens, by using the carriages 200 and 400 respectively having the nozzle head 20 and the nozzle head 40. The nozzle heads 20 and 40 having nozzles that are aligned in a different direction from each other move along the pair of the guide rails so as to draw the patterns of the color filters 70 and 50.

Since the carriage 200 and the carriage 400 move along the guide rails having different moving paths from each other, the carriages 200 and 400 do not mutually interfere in the sub scan and the main scan. Thus, the nozzles of the heads for the discharge can be respectively used in a freely moving manner, so that the nozzles can be moved to a desired positions corresponding to a shape of the color pixels of the color filter and can appropriately discharge the liquid body to each of the color pixels.

According to the liquid body discharge device 100 of the embodiment, the heads provided with nozzles of which alignment directions of nozzles are different from each other are provided in advance, so that no rotating mechanism for rotating an alignment direction of the nozzles of the nozzle heads needs to be provided to the carriages. As a result, the carriages do not become heavy because of having no rotating mechanism, and accordingly replacement of the carriages does not become complicated. Further, since variation of the nozzle positions caused by the rotating mechanism unlikely occurs, the liquid bodies are discharged at desired positions.

In the embodiment, it is set that the area of the liquid body discharged regions to which the liquid bodies are discharged by the main scan of the carriage is smaller than the area of the color liquid body discharged regions to which the liquid bodies are discharged by the main scan of the substrate P. This is due to the following reasons. That is, the nozzle head may be provided with structures such as a liquid body tank and a liquid body supplying mechanism as well as the discharge mechanism described above. In such case, the nozzle head may gain a considerable amount of weight. This may make a moving speed of the carriage slower than a moving speed of the substrate. In another case, the movement of the carriage causes a vibration of the nozzle head. As a result, the accuracy of a liquid body discharge position in the liquid body discharged regions is likely worsened in moving the carriage compared to the accuracy in moving the substrate, and therefore the moving speed of the carriage needs to be made slower than that of the substrate. In consideration of such case, in the embodiment, the area of the liquid body discharged regions to which the liquid bodies are discharged by the main scan of the carriage is set to be smaller than the area of the liquid body discharged regions to which the liquid bodies are discharged by the main scan of the substrate P so as to reduce a moving amount of the carriage. This can minimize a total scanning time required for drawing all the patterns.

However, this may not be necessarily performed. In contrast to this, for example, in a case where the moving speed of the carriage is faster than the moving speed of the substrate P, it is preferable that the substrate P be disposed by suction in advance such that the area of the liquid body discharged regions to which the liquid bodies are discharged by the main scan of the carriage is larger than the area of the liquid body discharged regions to which the liquid bodies are discharged by the main scan of the substrate P, and then the drawing processing be performed.

It should be understood that the invention is not limited to the above-mentioned embodiment, and various changes can be made without departing from the spirit and scope of the invention. Hereinafter, modifications will be described.

First Modification

In the embodiment described above, the liquid body discharge device 100 includes each one of the carriage 200 having the nozzles aligned in the X-axis direction and the carriage 400 having the nozzles aligned in the Y-axis direction that is orthogonal to the X-axis direction. However, needless to say, the invention is not limited to this. For example, the liquid discharge device 100 may include a plurality of carriages 200 or a plurality of carriages 400. Further, the liquid discharge device 100 may include the plurality of both carriages 200 and 400 at the same time.

Figure 9:
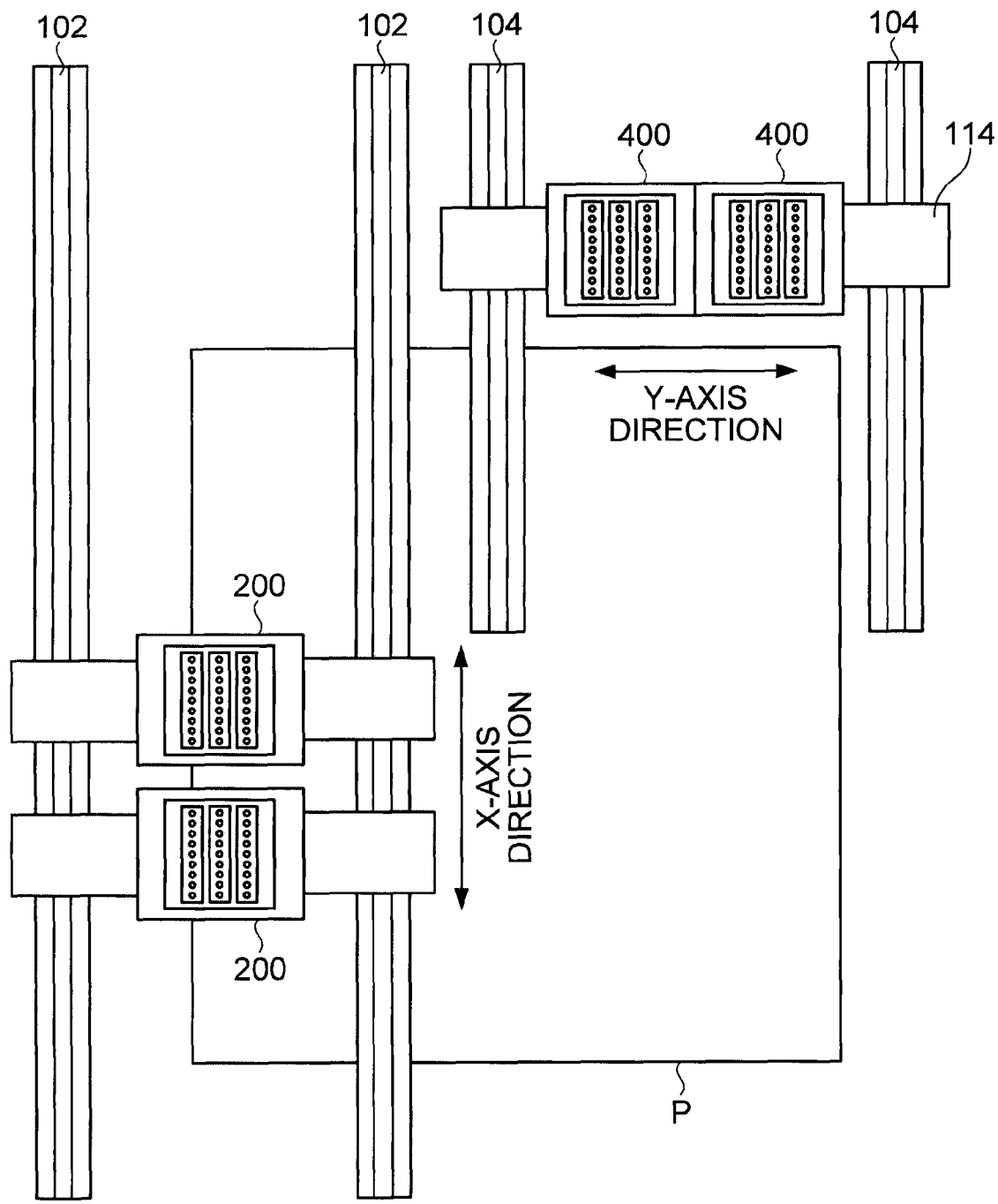
FIG. 9 is a diagram explaining positions of carriages in a case of employing a plurality of carriages according to a first modification.

FIG. 9 shows a case where a liquid body discharge device includes two pieces of the carriages 200 and two pieces of the carriages 400 as an example. FIG. 9 is a schematic view illustrating an arrangement of the carriages 200 and 400 when the substrate P is viewed from the top. Here, the nozzle heads of the carriages are shown in a transparent view.

As illustrated, in a case where the plurality of carriages 200 and the plurality of carriages 400 are provided, it is preferable that the carriages 200 be apposed in the X-axis direction and the carriages 400 be apposed in the Y-axis direction. As it is clear in the description with reference to FIGS. 4 and 5 in the embodiment above, this structure increases a width in the X-axis direction of the liquid discharged regions to which the liquids are discharged from the nozzles when the plurality of carriages 200 that are apposed are relatively moved in the Y-axis direction in accordance with the substrate P moving in the Y-axis direction. Further, this structure increases a width in the Y-axis direction of the liquid discharged regions to which the liquids are discharged from the nozzles when the plurality of carriages 400 which are apposed are moved in the X-axis direction. As a result, an area of the liquid body discharged regions to which the liquid bodies are discharged from the nozzles with one time main scan is enlarged, thereby reducing the number of scans required for discharging the liquid bodies to all the regions.

In the first modification, when the liquid body discharge device 100 includes the plurality of carriages 400, it is preferable that all the plurality of carriages 400 be concurrently moved by the carriage moving stage 114. This structure can suppress increase of the number of the guide rails 104 and the number of the carriage moving stages 114, thereby preventing the liquid body discharge device 100 from being complicated and preventing an increase of a manufacturing cost.

Second Modification

In the embodiment described above, the nozzle groups (20R, 20G, and 20B) formed in the nozzle head 20 are aligned in the X-axis direction and the nozzle groups (40R, 40G, and 40B) formed in the nozzle head 40 are aligned in the Y-axis direction that is orthogonal to the X-axis direction. However, needless to say, the invention is not limited to this. For example, the nozzle groups may be inclined at 0 degrees with respect to the X-axis direction or the Y-axis direction.

Figure 10:
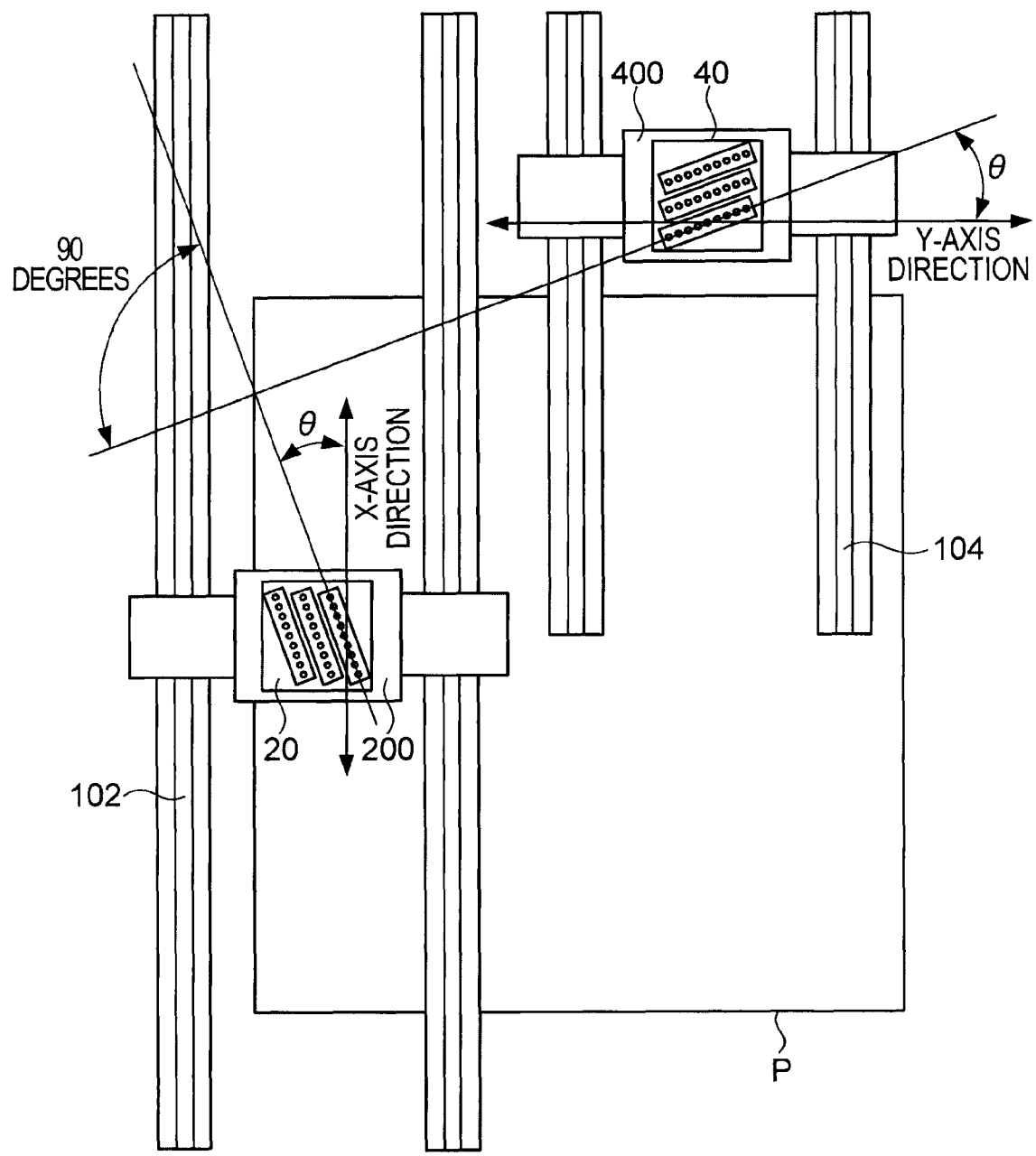
FIG. 10 is a schematic view illustrating a state in which an alignment direction of nozzles is inclined according to a second modification.

The second modification will be described with reference to FIG. 10. FIG. 10 is a schematic view illustrating the carriages 200 and 400 viewed from the top. Here, the nozzle head 20 and the nozzle head 40 are shown in a transparent view.

In the second modification, the nozzle groups formed in the nozzle head 20 of the carriage 200 are arranged so as to be inclined at θ degrees in a counterclockwise direction with respect to the X-axis direction, as illustrated. Likewise, the nozzle groups formed in the nozzle head 40 of the carriage 400 are arranged so as to be inclined at θ degrees in a counterclockwise direction with respect to the Y-axis direction. In this case, nozzle pitches of the nozzle groups are narrowed in the direction orthogonal to the main-scanning direction. Therefore, although the width of a region, to which the liquid bodies are discharged from the nozzles at the main scan, of the liquid body discharged regions is narrowed, the number of the nozzles that can discharge the liquid bodies to the liquid body discharged regions is increased. As a result, the number of the liquid body discharged regions to which the liquid bodies cannot be discharged from the nozzles with one main scan is reduced, so that it can be expected that the number of the main scans required for discharging the liquid body to all the liquid body discharged regions is reduced.

Further, in the modification, the nozzle head 40 can concurrently used at the main scan of the substrate P, that is, in the drawing using the nozzle head 20. In this case, both the nozzle heads having the nozzles aligned nearly orthogonal to each other are used, increasing possibility of existence of the nozzles having a preferable alignment direction depending on a shape of the liquid discharged regions. As a result, increase of the number of the liquid body discharged regions to which the liquid bodies can be discharged with one time main scan can be expected.

In the second modification, the direction in which the nozzle groups are arranged in the nozzle head 20 and the direction in which the nozzle groups are arranged in the nozzle head 40 are inclined at the same angle, that is, θ degrees, in the counterclockwise direction. However, needless to say, the nozzle groups of the nozzle heads 20 and 40 may be inclined at different angles or in different directions from each other. Based on a shape of the drawing pattern to be formed on the substrate P, inclination of each of the nozzle groups can be set to have a preferable value of the nozzle pitch.

Third Modification

In the embodiment, the X-axis direction in which the carriage 200 and the carriage 400 moves is orthogonal to the Y-axis direction in which the substrate P moves, that is, the main-scanning direction is orthogonal to the sub-scanning direction. However, the X-axis direction does not have to be orthogonal to the Y-axis direction. The liquid body discharged regions are typically in rectangular shapes each having sides that are orthogonal to each other in most cases. Therefore, the X-axis direction and the Y-axis direction are orthogonal to each other in the embodiment above. However, in a case where the liquid body discharged regions are not in rectangular shapes, the X-axis direction or the Y-axis direction is preferably changed in accordance with the shapes of the liquid body discharged regions as this structure has a higher possibility of increasing the liquid body discharged regions that can be drawn with one time main scan.

Figure 11:
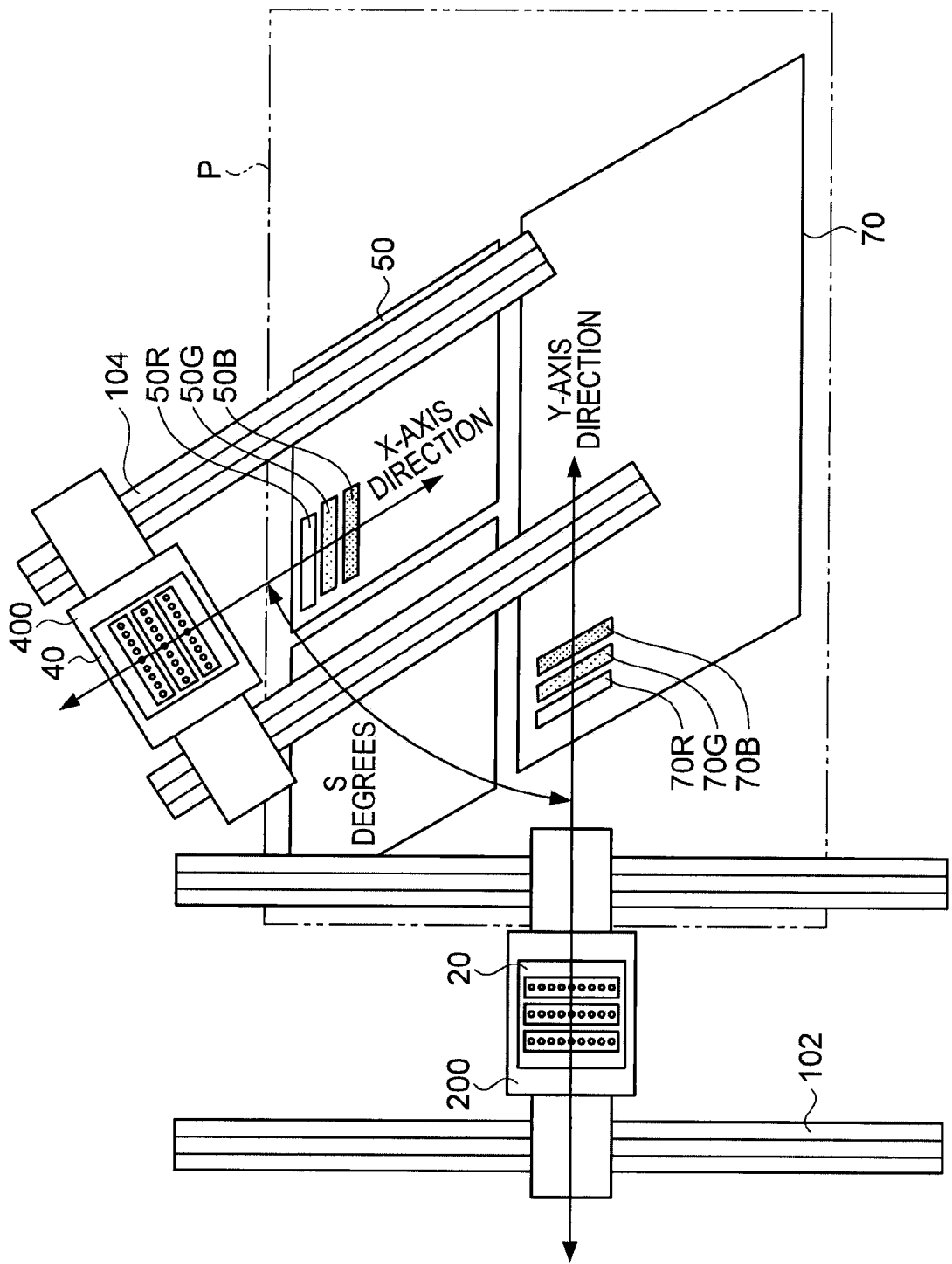
FIG. 11 is a schematic view illustrating a state in which a moving direction of the carriages is inclined according to a third modification.

The third modification will be described with reference to FIG. 11 by using an example. FIG. 11 is a schematic view illustrating the carriages 200 and 400 viewed from the top. Here, the nozzle head 20 and the nozzle head 40 are shown in a transparent view. As illustrated, the color filters 50 and the color filter 70 are in a parallelogram shape. The liquid body discharged regions 50R, 50G, and 50B and the liquid body discharged regions 70R, 70G, and 70B, to which the respective color liquid bodies are discharged, are also in a parallelogram shape. Further, the liquid body discharged regions 50R, 50G, and 50B are arranged along an oblique side of the parallelogram, and the liquid body discharged regions 70R, 70G, and 70B are arranged along a bottom of the parallelogram in the Y-axis direction.

In the third modification, the moving direction of the carriage 400 along the guide rails 104 is inclined at S degrees in a clockwise direction with respect to the Y-axis direction so that the X-axis direction in which the nozzle head 40 is moved is parallel to the oblique side of the parallelogram. In this case, for drawing patterns of the color filter 50, the nozzle head 40 provided to the carriage 400 moving along the guide rails 104 is moved as the main scan in a direction in which the liquid body discharged regions 50R, 50G, and 50B are arranged. For forming a pattern of the color filter 70, the nozzle head 20 provided to the carriage 200 is relatively moved with respect to the substrate P as the main scan in a direction, in which the liquid body discharged regions 70R, 70G, and 70B are arranged, in accordance with the main scan of the substrate P in the Y-axis direction. Therefore, increase of the liquid body discharged regions to which the liquid bodies can be discharged from the nozzles with one main scan can be expected. As a result, the time taken to complete all the drawing patterns can be shortened.

Fourth Modification

In the embodiment, the carriage 400 is moved in the X-axis direction as the main scan while the substrate P is moved in the Y-axis direction as the sub scan when the pattern to form the color filter 50 is drawn. However, the substrate P may be moved in the X-axis direction as the main scan as well as in the Y-axis direction as the sub scan. As described above, the carriage 400 may move at a slower speed than the substrate P when the carriage 400 is heavy. In this case, the pattern can be drawn faster when the substrate P is moved as the main scan rather than when the carriage 400 is moved as the main scan.

Figure 12:
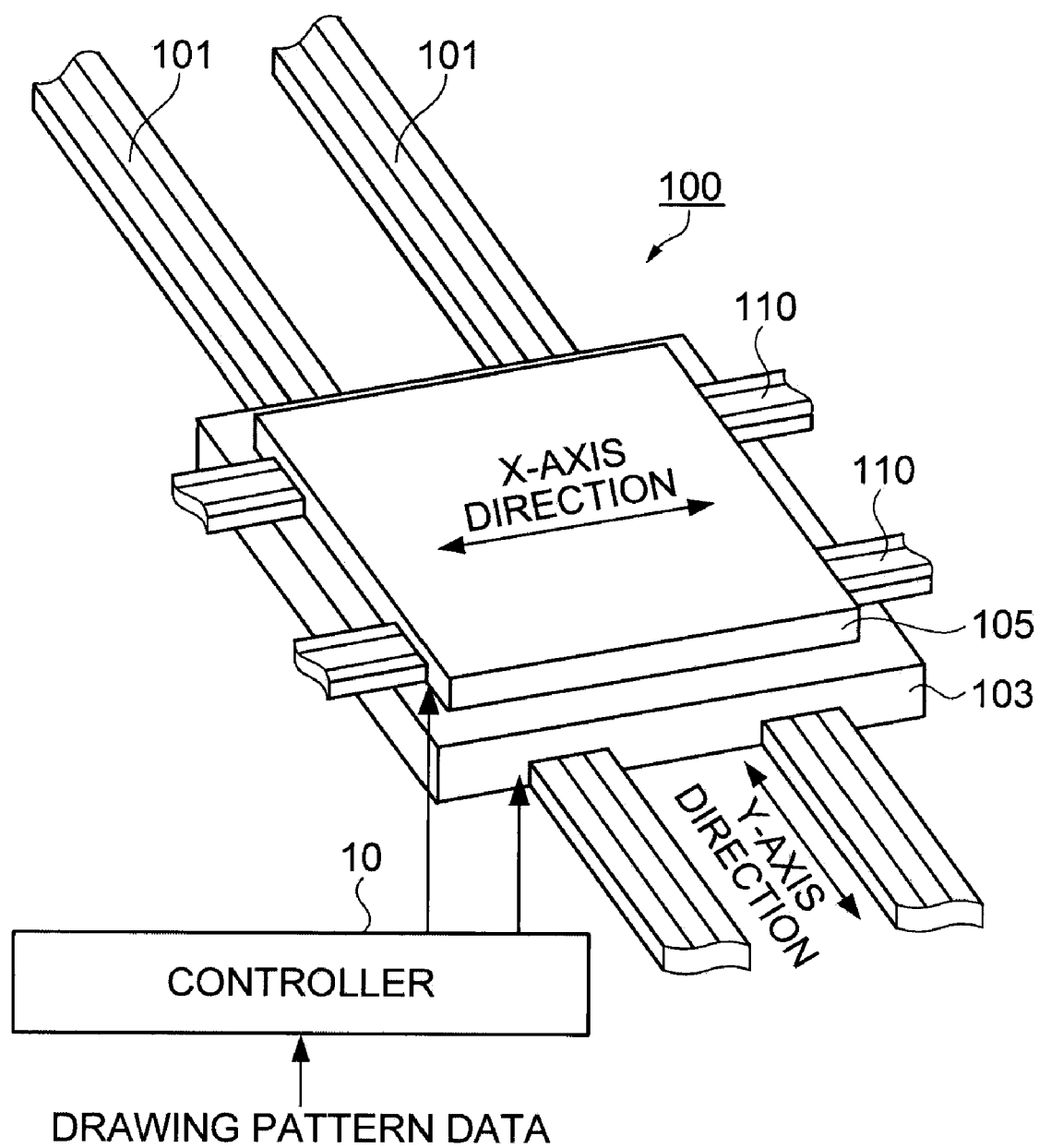
FIG. 12 is a perspective view illustrating a movable stage and a stage according to a fourth modification.

The fourth modification will be described with reference to FIG. 12 by using an example. FIG. 12 is a perspective view illustrating the movable stage 103 and the stage 105. In the modification, as illustrated, the stage 105 can move in the X-axis direction with respect to the movable table 103 with a pair of guide rails 110 that are linearly disposed on the movable table 103; and air sliders and linear motors (not illustrated) that are disposed inside the guide rails 110.

The movement of the stage 105 is controlled by the controller 10 in the same manner as the movable stage 103. That is, the CPU 11 drives the linear motors disposed inside the guide rails 110 so that the stage 105 is moved as the main scan in the X-axis direction instead of the movement of the carriage movable stage 114 in the X-axis direction by using data for a drawing pattern drawn on the substrate P.

In the fourth modification, in a case where the stage 105 is moved as the main scan in the X-axis direction and the scanning range of the stage 105 is limited, for example, by the position, which is an evacuating position of the carriage 200, of the capping device 210, it is preferable that the guide rail 104 be set apart from the guide rail 102 so as to avoid such limitation. In addition, when the pattern to form the color filter 70 is drawn, it may be accepted that the carriage 200 is not moved as the sub scan, but the stage 105 is moved as the sub scan in the X-axis direction.

Fifth Modification

In the embodiment described above, the guide rails 102 on which the carriage 200 moves are formed in a pair and the guide rails 104 on which the carriage 400 moves are formed in a pair, that is, the four guide rails in total are formed. However, the structure is not limited to this.

Figure 13:
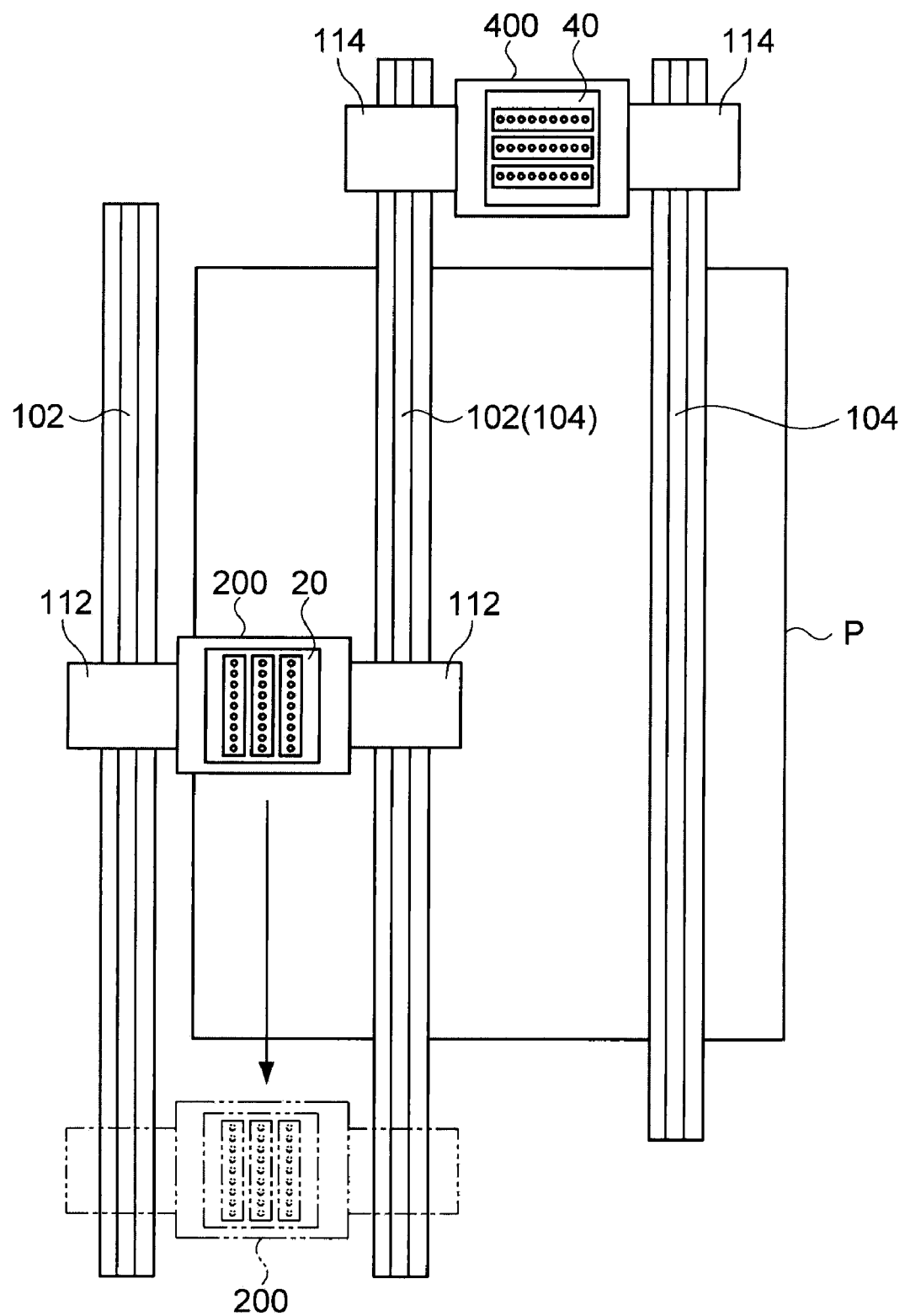
FIG. 13 is a schematic view illustrating each of the carriages viewed from the top according to a fifth modification.

For example, one guide rail of the pair of the guide rails 102 also serves as one guide rail of the pair of the guide rails 104, and thus the carriage 200 and the carriage 400 may move on three guide rails. FIG. 13 shows this structure. FIG. 13 is a schematic view illustrating the carriages 200 and 400 when the substrate P is viewed from the top. Here, the nozzle heads 20 and 40 of the carriages are shown in a transparent view.

As shown in the drawing, one guide rail 102, which is positioned at the right side in the drawing, of the pair of the guide rails 102 on which the carriage moving stage 112 of the carriage 200 moves also serves as one guide rail 104, which is positioned at the left side in the drawing, of the pair of the guide rails 104 on which the carriage moving stage 114 of the carriage 400 moves. As a result, the liquid body discharge device includes three guide rails so as to have a simplified structure.

As is apparent from FIG. 13, as for the movement of the carriage 200 and the carriage 400, moving ranges of the carriages 200 and 400 are mutually restricted depending on their positions because one of the guide rails 102 also serves as one of the guide rails 104. Therefore, it is preferable that the carriage 400 be evacuated from the scanning range of the substrate P in a case where a pattern to form a color filter is drawn by discharging the liquid body from the nozzle head 20. On the other hand, in a case where a pattern to form a color filter is drawn by discharging the liquid body from the nozzle head 40, it is preferable that the carriage 200 be moved to a position shown in a two-dot chain line so as to allow the carriage 200 to evacuate from the scanning range of the carriage 400.

Other Modifications

In the embodiment above, the substrate P is preliminary sucked and disposed on the stage 105 such that the longitudinal direction of the liquid body discharged regions in the color filter 70 for the large sized screen is in the X-axis direction. Further, in the embodiment, the total area of the liquid body discharged regions in the one piece of the color filter 70 is larger than the total area of the liquid body discharged regions of the two pieces of the color filters 50. Therefore, in the process flow chart shown in FIG. 6, the carriage to be used in each of the main-scanning directions is selected based on the size of the total area of the liquid body discharged regions. However, needless to say, it is not limited to this. For example, the longitudinal direction of the liquid body discharged regions included in each of the color filters formed on the substrate P is calculated from the drawing pattern data, and then, a carriage provided with a nozzle head having the nozzles aligned in a direction closest to the longitudinal direction may be selected. This allows the liquid bodies to be discharged from the nozzles aligned in a preferable direction corresponding to the shape of each of the liquid body discharged regions on each of the color filters 70 and 50 regardless of the total area of the liquid body discharged regions on each of the color filters to be formed on the substrate P.

In the embodiment, after the pattern to form the color filter 70 is drawn with the nozzle head 20, the patterns to form the color filters 50 are drawn with the nozzle head 40. However, the patterns may be drawn concurrently. Accordingly, time for drawing patterns of all color filters can be shortened. For example, in the drawing processing of the pattern to form the color filter 70, while the carriage 200 is moved as the sub scan, the carriage 400 may be moved as the main scan so as to draw the patterns to form the color filters 50. This drawing method can be employed because the carriage 200 and the carriage 400 move on different guide rails from each other.

Further, in the embodiment, the movable stage 103, the carriage moving stages 112 and 114 are moved by the moving unit including the air sliders and the linear motors disposed inside the guide rails 101, 102, and 104. However, it is not particularly limited to this, and a moving unit including a motor and a belt, or a moving unit including a ball screw and a motor may also be employed. In other words, any configuration is applicable as long as the movable stage 103 and the carriage moving stages 112 and 114 can be moved.

In the embodiment, the color pixels formed in the color filters 50 or the color filter 70 are arranged in a stripe arrangement in which the color pixels of the same color are consecutively formed in the longitudinal direction of the color pixels. However, it is not limited to this, and they may be arranged in a delta arrangement, or a mosaic arrangement. Further, the number of colors of the color filters is three of R, G, and B. However, it is not limited to this, the number of colors may be increased to four or decreased to two, for example. Furthermore, the color pixels in the color filters 50 and the color pixels in the color filter 70 may be the same in shape, or may be different from each other in size or shape.

Further, in the embodiment, the liquid body discharge device 100 that discharges color liquid bodies on a glass substrate so as to form a color filter is described as a liquid body discharge device. However, needless to say, it is not limited to this. For example, the invention may be practiced with a manufacturing device to form a metal wiring pattern by discharging a functional liquid containing a metal material on a silicon substrate, a ceramic substrate, or a resin substrate, as well as the glass substrate, or with a device for manufacturing an organic EL element to form a light emitting element by discharging a functional liquid containing a light-emitting material made of an organic material as a solute on a liquid discharged region. In other words, the invention can be similarly practiced by any device as long as the device can record a pattern such as an image or a graphic, or a letter on a liquid body discharged object such as a substrate by discharging a functional liquid using a method for discharging a liquid body.

The entire disclosure of Japanese Patent Application No. 2008-13424, filed Jan. 24, 2008 is expressly incorporated by reference herein.

What is claimed is:

1. A liquid body discharge device, comprising:
a plurality of nozzles for discharging a liquid body to a liquid body discharged region of a substrate; and
a plurality of heads including the plurality of nozzles,
wherein the liquid body is discharged to the liquid body discharged region of the substrate by moving one of the substrate and the plurality of heads,
wherein an alignment direction of the plurality of nozzles provided to at least one of the plurality of heads is orthogonal to an alignment direction of the plurality of nozzles provided to a rest of the plurality of heads,
wherein the at least one of the heads moves in a moving path A and the rest of the plurality of heads moves in a moving path B that is a different moving path from the moving path A.

2. The liquid body discharge device according to claim 1, further comprising:
a head moving unit that moves the at least one of the plurality of heads in a first direction along the moving path A in a case where the liquid body is discharged from the plurality of nozzles provided to the at least one of the plurality of heads to the liquid body discharged region; and
a substrate moving unit that moves the substrate in a second direction that is orthogonal to the first direction in a case where the liquid body is discharged from the plurality of nozzles provided to the rest of the plurality of heads to the liquid body discharged region.

3. The liquid body discharge device according to claim 1, further comprising:
a substrate moving unit that moves the substrate in the first direction along the moving path A in a case where the liquid body is discharged from the plurality of nozzles provided to the at least one of the plurality of heads to the liquid body discharged region, and moves the substrate in the second direction that is orthogonal to the first direction in a case where the liquid body is discharged from the plurality of nozzles provided to the rest of the plurality of heads to the liquid body discharged region.

4. The liquid body discharge device according to claim 2, wherein in a case where the at least one of the plurality of heads is formed in a plural number, the heads are opposed in a direction orthogonal to the first direction.

5. The liquid body discharge device according to claim 2, wherein the first direction and the second direction are substantially orthogonal to each other.

6. A droplet discharge device, comprising:
a first movable droplet discharge head having a first plurality of nozzles aligned in a first direction;
a second movable droplet discharge head having a second plurality of nozzles aligned in a second direction, the second direction being orthogonal to the first direction; and
a movable stage supporting at least a first substrate and a second substrate thereon, each of the first and second substrates having a plurality of droplet discharge regions thereon for receiving droplets ejected from either the first movable discharge head or the second movable discharge head, the droplet discharge regions of the first substrate being arranged orthogonal to the droplet discharge regions of the second substrate,
wherein the alignment directions of the first and second movable droplet discharge heads correspond to arrangements of the droplet discharge regions of the first and second substrates.

* * * * *